United States Patent [19]

Torras

[11] Patent Number: 4,926,621
[45] Date of Patent: May 22, 1990

[54] MOWING TRACTOR WITH TOWED MOWER

[76] Inventor: Robert M. Torras, 101 Gould St., Simons Island, Ga. 31522

[21] Appl. No.: 281,061

[22] Filed: Dec. 7, 1988

Related U.S. Application Data

[63] Continuation-in-part of Ser. No. 197,094, May 20, 1988, abandoned, and a continuation-in-part of Ser. No. 914,712, Oct. 2, 1986, Pat. No. 4,876,846.

[51] Int. Cl.⁵ .................. A01D 75/30; A01B 59/04
[52] U.S. Cl. .......................................... 56/6; 56/15.8; 56/DIG. 22; 280/494
[58] Field of Search ............ 56/6, 7, 8, 9, 13.6, 56/15.8, 15.7, 15.9, DIG. 22; 280/411 A, 412, 413, 456 A, 460 A, 461 A, 476 A, 492, 493, 494

[56] References Cited

U.S. PATENT DOCUMENTS

| | | | |
|---|---|---|---|
| 2,579,118 | 2/1948 | Land | 280/443 |
| 2,743,567 | 5/1956 | Martin | 56/6 |
| 2,920,434 | 1/1960 | Ingram | 56/13.6 X |
| 3,154,903 | 11/1964 | Smith | 56/DIG. 22 X |
| 3,329,225 | 7/1967 | Dunn | 180/14.1 |
| 3,514,126 | 5/1970 | Fuss | 56/6 |
| 3,608,284 | 4/1970 | Erdman | 56/6 |
| 3,650,096 | 3/1972 | Caldwell | 56/7 |
| 3,717,981 | 2/1973 | van der Lely | 56/6 |
| 3,736,735 | 6/1973 | Kulak et al. | 56/13.6 |
| 3,951,435 | 4/1976 | Greatbach | 280/492 X |
| 4,009,556 | 3/1977 | Molzahn | 56/10.7 |
| 4,135,349 | 1/1979 | Schwertner | 56/6 |
| 4,258,535 | 3/1981 | Jones et al. | 56/13.6 |
| 4,304,086 | 12/1981 | Stuchl | 56/6 |
| 4,442,658 | 4/1984 | Cartner | 56/6 X |
| 4,497,160 | 2/1985 | Mullet et al. | 56/6 |
| 4,700,536 | 10/1987 | Torras | 56/15.8 |
| 4,744,580 | 5/1988 | Ryan | 280/411 A |

Primary Examiner—Stephen J. Novosad
Assistant Examiner—David J. Bagnell
Attorney, Agent, or Firm—Thomas & Kennedy

[57] ABSTRACT

The towed mower (22) is attached by a hitch (44) to the self propelled front mower (21). The front mower has its own forwardly positioned cutter unit (30). The towed mower has a centrally positioned frame segment (62) that does not include a cutting blade, and the two side frame segments (63) and (64) each include cutting blades that are supported in bat-wing fashion from the central frame segment. The swath cut in the grass by the front mower 21 is straddled by the swaths cut by the blades of the side frame segments (63) and (64) of the towed mower (22).

24 Claims, 6 Drawing Sheets

MOWING TRACTOR WITH TOWED MOWER

CROSS REFERENCE TO RELATED APPLICATIONS

This application is a continuation-in-part of U.S. Patent application Ser. No. 197,094 filed May 20, 1988, now abandoned and is a continuation-in-part of U.S. Patent application Ser. No. 914,712 filed Oct. 2, 1986, U.S. Pat. No. 4,876,846.

FIELD OF THE INVENTION

The invention disclosed herein relates to a self propelled riding mowing tractor or mowing machine of the type adapted for cutting grass and other vegetation, and includes a towed mower which can be detachably mounted to the front self propelled mowing tractor in trailer fashion, and the towed mower can be attached to and work in combination with the front mowing tractor for cutting over relatively flat, wide terrain, with the mowing tractor cutting a central swath in the grass and the towed mower cutting outer swaths in the grass that straddle the central swath.

DESCRIPTION OF THE PRIOR ART

Self propelled riding mowers are commonly used for the purpose of cutting grass and other vegetation and the mowers have been constructed in several different design categories. Mowers are commonly used for the purpose of cutting grass and other vegetation for agricultural and ornamental purposes. Mowers are constructed in different categories such as walk behind, riding, and remote controlled. Mowers are pushed, pulled, self propelled and self powered, or are powered and propelled by tractors or other accommodating units. The cutters on mowers consist of one or more cutting devices, such as rotary blades, reel cutters, flail cutters and sickle bar cutters, which are grouped into cutter assemblies. Several cutter assemblies may be used on one mowing machine.

For example, the prior art mower designs include the conventional high standing farm style tractor, garden tractor or mowing machine having cutter elements mounted beneath the belly of the tractor, behind the steerable front wheels and in front of the rear powered wheels.

Another prior art mower assembly includes the conventional farm style tractor and a towed mower assembly pulled behind the tractor, with the power take off system of the tractor functioning to power the cutter elements of the towed mower. In some instances, the towed mower includes a central, forwardly positioned rotary cutting blade and side blades positioned out to the side and slightly behind the forward blade, with a central gear box that is driven by the power take off of the tractor, and with driving shafts extending from the central gear box to the side cutting blades. In some models the cutting blades are driven by hydraulic motors, with the tractor having a pump that operates the hydraulic motors. The individual side cutter assemblies on this style of mower usually can be tilted to cut at different heights or to reduce the width of the unit for better handling, particularly when the mower is in transit on a public road. When the side cutter blades are raised with respect to the center cutter blades, the center cutter blade does not have shields that prevent objects from being thrown to the side. Therefore the mower is unsafe to operate with side cutter blades raised.

Another type of prior art mower comprises a tractor or self propelled mower provided with cutter assemblies that are positioned out in front of the tractor, or under its belly, and some include both front and side mounted cutter assemblies to broaden the swath cut by the assembly. These side cutter attachments normally follow the contour of the ground but may be raised and lowered to cut over objects or to facilitate transit.

Another type prior art mower configuration used for slope mowing is the type generally illustrated in U.S. Pat. No. 4,700,536 and comprises a low profile slope mower which includes a power unit having rear driving wheels and a forwardly positioned cutter unit which supports the cutter blades. The low profile of this unit together with the relatively high engine power and good maneuverability of the unit makes the unit stable when cutting on sloped surfaces, such as along the embankments of interstate highways, golf course embankments, ditch banks, ski slopes and other finish, refined or roughly vegetated sloped terrains.

However, none of the prior art mowers known to the inventor have successfully included a front self propelled riding mowing tractor with its own cutter and a rear trailing towed mower connected to the front tractor by a central pivoting hitch, with side cutters that straddle and broaden the swath cut in the grass by the front mower and which can be tilted upwardly. It is to this arrangement of mower elements that this invention is directed.

SUMMARY OF THE INVENTION

Briefly described, the present invention comprises a front cutting or belly cutting self propelled riding mowing tractor or mowing machine, with a rear towed mower, whereby the towed mower is pulled along in trailer fashion behind the forwardly positioned self propelled mowing tractor. The front self propelled mowing tractor or mowing machine, referred to sometimes herein as the "front mower", includes its own cutting unit with an engine that is used to power its driving wheels as well as its front or belly mounted mower. A trailer connecting device is mounted between the front mower and the towed mower so that the towed mower is connected to and follows the front mower in trailer fashion.

The towed mower has three frame segments. The central frame segment includes ground engaging support wheels, a portion of the connecting device to the front mower and hinge means for the two side frame segments. The side frame segments each includes at least one cutter and a supporting wheel member. The cutters of the towed mower assembly preferably are powered by the engine of the front mower; however, the towed mower can be constructed with its own independent source of power to its cutters. The noncutting central frame segment of the towed mower is positioned so as to ride over the swath previously cut by the cutter unit of the front self propelled mower, whereas the side segments of the towed mower are positioned so that their cutters cut swaths that straddle and intersect the central swath, resulting in the formation of one wide uninterrupted cut.

The prior art towed mowers of the type having a center cutter and hinged side cutters typically have the cutters arranged in a longitudinally staggered, overlapped relationship so as to avoid leaving streaks of uncut grass. Because of this requirement these cutter assemblies are long in relation to their width. However, the towed mower of this invention has its central frame segment constructed without a cutter. Therefore the cutters of the side frame segments of the towed mower do not have to be offset longitudinally with respect to a central cutter and the length of the towed mower of this invention is shortened by the absence of the usual central cutter. Moreover, the overall length of the combined self propelled front mower and towed mower is shortened. Further, the distance between the supporting wheels of the towed mower and the rear driving wheels of the forwardly positioned self propelled mower is minimized by the short configuration of the towed mower. This configuration results in the towed mower closely following the swath cut by the forwardly positioned cutter of the self propelled mower when the self propelled mower and towed mower are driven through a turn, as well as when trailing over undulating turf. When the two cutter units are raised vertically on the towed mower the width of the towed mower is less than the width of the front mower and the front mower can be used to trim close to and around objects since the nonfunctioning towed mower will trail within the cut swath of the front mower. This configuration provides the best trimming capability of the front mower as the rear mower does not engage an obstacle outside the path of the front mower.

Optionally, the trailer connecting device that connects the towed mower in trailer fashion to the front mower can be made easily detachable, enabling the operator to quickly attach and detach the towed mower from the self propelled front mower, so that the operator can mow the broad, flat surfaces of an area with the combination of the self propelled front mower and the rear towed mower, and the operator can quickly detach the towed mower from the front mower and use the front mower separately to mow in confined areas, to perform slope mowing or to power or propel various attachments that can be mounted to the front mower.

Thus, it is an object of this invention to provide an improved self propelled front mower and towed mower combination, whereby the towed mower is towed behind the front mower in trailer fashion and the cutters of the towed mower straddle and broaden the cut swath formed by the cutters of the front mower.

Another object of this invention is to provide a towed mower that is adaptable for being towed behind a front self propelled mower, whereby the towed mower has laterally displaced side cutting elements which are arranged to straddle the swath cut by the forwardly positioned cutter unit of the self propelled mower, and includes a central frame segment that does not have a cutting element and rides over the swath cut by the forwardly positioned self propelled mower and which allows the towed mower to be relatively short in length and highly maneuverable.

Another object of this invention is to provide a towed mower for attachment to a front mower which has a central frame segment and vertically hinged side frame segments which can be raised to nonoperating vertical positions for transport and to facilitate trimming with the front mower and to avoid collision between the rear mower and obstacles being trimmed around.

Another object of this invention is to provide a self propelled mower with a detachable towed mower, with the front self propelled mower being of low center of gravity construction suitable for mowing on sloped surfaces, and with the rear towed mower comprising three frame segments which are tiltable with respect to each other, with a central frame segment arranged to ride over the swath cut by the front self propelled mower and with the side frame segments supporting cutters that cut side swaths that straddle and broaden the central swath cut by the front mower.

Another object of this invention is to provide an improved, light weight towed mower that closely follows a front mower in centrally pivoted trailer fashion and which includes side cutters that straddle and broaden the swath cut by the front mower, and which skew to the side when propelled into objects that may have passed to the side of the front cutter so that damage to the towed cutter, dislocation of the front mower and damage to the object impacted are all reduced or substantially eliminated because of the angled arrangement of the cutters along with angled front edges of the housing and the relatively reduced weight and length of the towed mower due to the absence of a center cutting section.

Another object of this invention is to provide a self propelled front mower with a centrally pivoted detachable towed mower giving a combined wide cutting swath and a short turning radius due to the overall length of the towed mower being reduced by the absence of a center mowing section.

Another object of this invention is to provide a front self propelled mower and a rear towed mower combination with the towed mower having cutter sections that straddle the cut swath formed by the front mower and which can be tilted to upright inoperative positions as the front mower continues to operate and continues to form its cut swath.

Another object of the invention is to provide a self propelled front mower and a towed mower combination, with the towed mower having side cutters that straddle the swath cut by the front mower and which can be tilted upwardly to inoperative positions so that the width of the towed mower is less than the width of the front mower whereby the front mower can be used to trim about objects with the towed mower trailing directly in the cut swath of the front mower in a path that will not impact the objects trimmed around by the front mower.

Other objects, features and advantages of this invention will become apparent upon reading the following specification, when taken in conjunction with the accompanying drawings.

DETAILED DESCRIPTION

Figure 1:
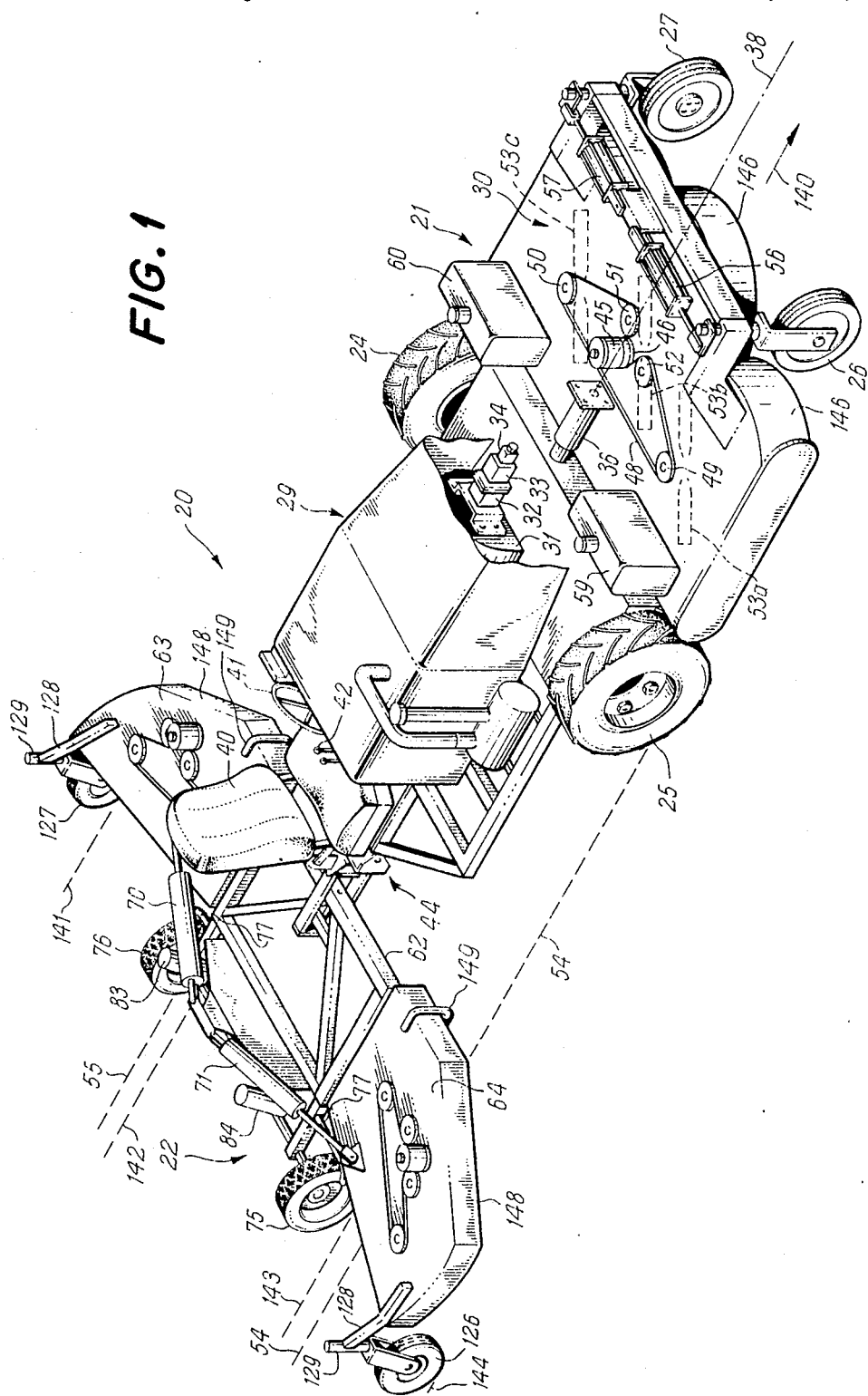
FIG. 1 is a perspective illustration of a mower assembly showing the front and right hand side of both the front self propelled mower and the rear towed mower.

Referring now in more detail to the drawings, in which like numerals indicate the like parts throughout the several views, FIG. 1 illustrates the mower assembly 20 which includes a front self propelled riding mowing tractor 21 and a rear towed mower 22. The front self propelled mowing tractor 21, referred to as the "front mower", is illustrated as a slope mower of the type that has rear powered driving wheels 24 and 25, front steerable wheels 26 and 27, with the rear powered wheels 24 and 25 supporting a power unit 29 and the front steerable wheels supporting a cutter unit 30.

The power unit 29 of the front mower 21 includes an internal combustion engine 31 that operates a plurality of pumps 32, 33 and 34 which are mounted in series on the engine 31. Pump 32 is the wheel propulsion pump, pump 33 is the front deck drive pump, and pump 34 is the drive for auxiliary functions such as power steering and lift cylinders. Other pumps (not shown) are located behind and are driven by the engine which function as the towed mower drive pumps.

A pivot connection 36 functions to connect the cutter unit 30 to the power unit 29 so that the cutter unit 30 is pivotable about a longitudinal axis 38. The pumps 32–34 project from the internal combustion engine 31 over the pivot connection. With this arrangement, the cutter unit 30 can tilt with respect to the power unit 29 during the movement of the mower assembly over uneven terrain, and the pumps 32, 33 and 34 remain in a space above the cutter unit 30 without obstructing the tilting movements of the cutter unit with respect to the power unit.

The power unit 29 includes a driver's seat 40 that is located rearwardly of the driving wheels 24 and 25, with a steering wheel 41 and various throttle controls, pump controls and other controls 42 located in front of the driver's seat. A trailer tongue 44 projects from the power unit 29 adjacent the driving wheels 24 and 25 rearwardly beneath the driver's seat to the towed mower 22 and is connected to the towed mower.

The cutter unit 30 of the front mower 21 has a hydraulic motor 45 mounted to the decking of the cutter unit, and a drive sheave 46 mounted on top of the motor 45 engages the driving belt 48. The driving belt 48 extends to driven sheaves 49, 50 and 51 and the sheaves are each connected by means of a mandrel to a cutting blade beneath the decking of the cutter unit 30. A spring biased idler sheave 52 maintains proper tension in the driving belt 48. The rotary cutters 53a, 53b and 53c driven by the driving belt 48 are arranged in a triangular staggered relationship with respect to each other so as to cut a single swath in the grass beneath the cutting deck 21, as indicated by the dash lines 54 and 55.

The front self propelled mower 21 is steered by its front steerable wheels 26 and 27. Hydraulic cylinders 56 and 57 impart steering motion to the wheels 26 and 27, and the cylinders 56 and 57 are operated by a power steering pump 34, which is in turn controlled by the steering wheel 41 of the power unit 29. Fuel tanks 59 and 60 are mounted to the decking of the cutter unit 30 and supply fuel to the internal combustion engine 31.

Figure 2:
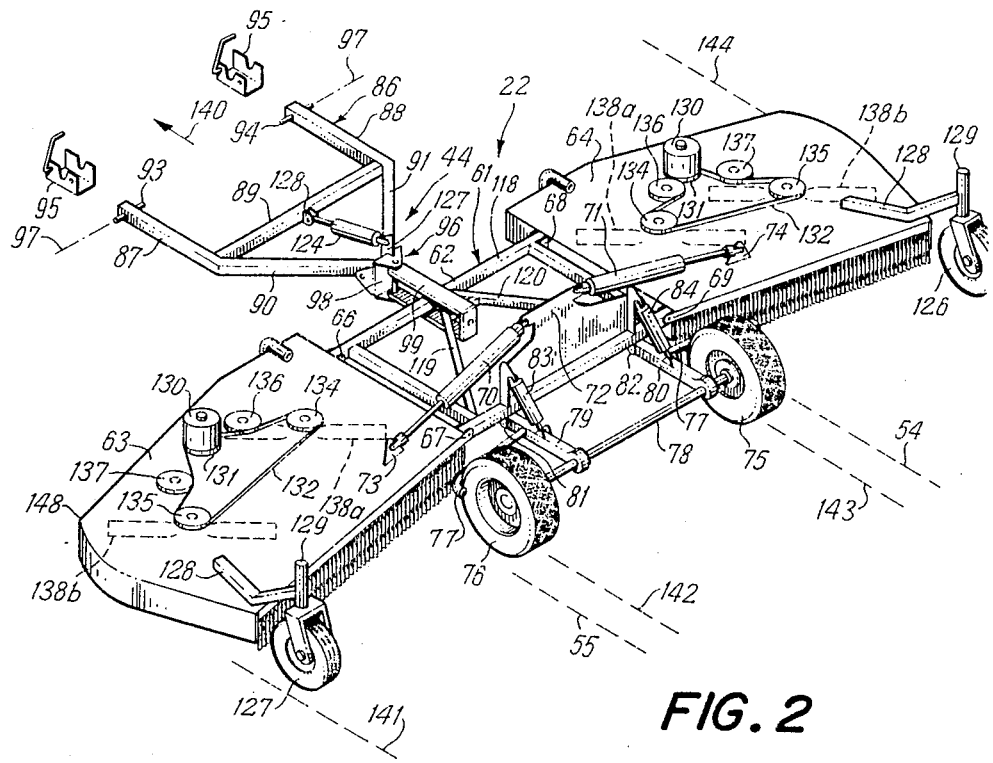
FIG. 2 is a perspective illustration of the towed mower, showing the left hand side and rear of the towed mower.

As illustrated in FIG. 2, the rear towed mower 22 comprises a support frame 61 having a central segment 62 and side segments 63 and 64 located on opposite sides of the central segment 62. The side segments 63 and 64 are covered by sheet metal decking, with the decking forming part of the side segment support frame. The side segments 63 and 64 are tiltable with respect to the central segment by means of hinges 66, 57 and 68, 69. Hydraulic cylinders 70 and 71 are each connected between a central frame element 72 on the central segment 62 and to stanchions 73, 74 mounted to the side segments 63, 64. When the cylinders 70 and 71 are retracted, the side segments 63 and 64 are tilted up to a vertical attitude suitable for highway travel, and when the cylinders 70, 71 are extended the side segments 73 and 74 are tilted back down to a horizontal attitude suitable for mowing.

Central support wheels 75 and 76 are positioned behind and slightly out to the side of central segment 62 of the rear towed mower 22 with the wheels being mounted to axle 78. The axle in turn is mounted to support arms 79 and 80, with the support arms being pivotably mounted at their forward end portions to stanchions 81 and 82 of central segment 62. Hydraulic cylinders 83 and 84 extend between central frame element 72 in a downwardly sloped direction and each cylinder 83, 84 is connected at its lower end to support arm 79 or 80. When the cylinders 83 and 84 are extended, the rear portion of the support frame 61 is raised away from the ground surface by the downward tilting of the support arms 79 and 80. Likewise, when the cylinders 83 and 84 are retracted, the support arms 79 and 80 tend to assume a horizontal attitude, thereby lowering the rear portion of the support frame 61. This permits the operator to selectively elevate the rear portion of the support frame of the central segment 62.

Figure 3:
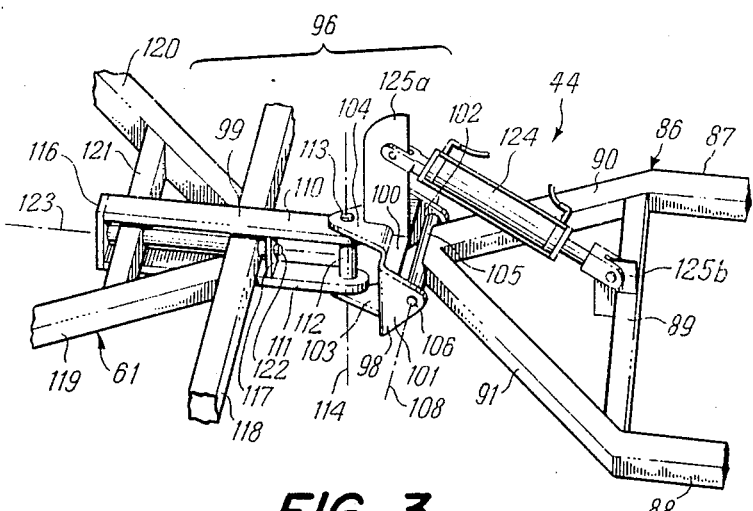
FIG. 3 is a detail perspective of the trailer hitch connection between the front mower and towed mower.

As illustrated in FIGS. 2 and 3, the trailer tongue assembly 44 which connects the front self propelled mower 21 to the rear towed mower 22 comprises an approximately U-shaped forward tongue member 86 having side legs 87 and 88, a base leg 89 and coverging legs 90 and 91. The distal ends of the side legs 87 and 88 have laterally extending pins 93 and 94 rigidly mounted thereto, and the pins 93 and 94 are pivot about axis 97 and are releasibly received in sockets 95 connected to the frame of the front self propelled mower 21 immediately adjacent the axis of rotation of the rear powered wheels 24 and 25. The connection of the forward tongue member 86 to the frame of the front self propelled mower immediately adjacent the driving wheels 24 and 25 causes the weight of the rear towed mower 22 that is applied to the front self propelled mower 21 to be applied adjacent the wheels 24 and 25, thereby minimizing any tilting effect of the applied weight to the front mower. When the towed mover is to be detached from the front mower the pins 93 and 94 are withdrawn from the sockets 95.

The trailer tongue assembly 44 further includes a universal joint 96 (FIG. 3), which includes a double clevis connector 98 and a swivel assembly 99. Double clevis connector 98 includes a base plate 100 and forwardly extending vertical clevis leaves 101 and 102 and rearwardly extending horizontal clevis leaves 103 and 104. A socket 105 is mounted in a horizontal attitude to the rear portion of forward tongue member 86, and pivot pin 106 extends through socket 105 and aligned openings of the forwardly extending vertical clevis leaves 101 and 102. This forms a horizontal pivot connection between the double clevis connector 98 and forward hitch member 86 about the horizontally extending axis 108.

Swivel assembly 99 includes a pair of spaced parallel support bars 110 and 111, with a vertical socket 112 mounted between the bars 110 and 111 at their forward end portions. The socket 112 is oriented vertically and is positioned between aligned openings of the rearwardly extending horizontal clevis leaves 103 and 104, and pivot pin 113 extends through the socket 112 and the openings of the clevis leaves 103 and 104, forming a vertical pivot axis 114.

The rear end portions of support bars 110 and 111 of the universal joint 96 are rigidly connected together by means of plates 116 and 117, and the plates 116 and 117 together with the support bars 110 and 111 surround lateral frame element 118, angle frame legs 119 and 120 and base leg 121. Pivot pin 122 extends through lateral frame element 118 and base leg 121, and through plates 116 and 117. The support bars 110 and 111 are spaced apart a distance greater than the thickness of the lateral frame element 118 and base leg 121, so that these elements can tilt with respect to each other around pivot pin 122. This construction permits the U-shaped forward tongue member 86 to rotate about the longitudinal axis 123 with respect to the support frame 61, with the longitudinal axis 123 extending along the length of the pivot pin 122. Thus, the universal joint 96 allows the rear towed mower 22 to have freedom of movement around the two axes 114 and 123 while the hitch pins 93 and 94 and their sockets 95 permit freedom of movement about axis 97 as the rear towed mower 22 is pulled by the front self propelled mower 21 over uneven terrain.

The height of the forward portion of the support frame 61 is adjustable by means of hydraulic cylinder 124. The end portions of cylinder 124 are connected to the stanchions 125a and 125b, with the retraction of the cylinder rod into the cylinder causing the stanchions 125a and 125b to move closer together and therefore move the trailer tongue 44 down toward the ground and thereby moving the forward portion of the support frame 61 downwardly, whereas when the cylinder rod of cylinder 124 is extended, the stanchions 125a and 125b are urged apart so as to tend to lift the trailer hitch away from the ground and to raise the forward portion of support frame 61.

With this arrangement, when cylinders 83, 84 and 124 are extended, the support frame 61 of the rear towed mower will be lifted away from the ground surface. Likewise, when the cylinder 83, 84 and 124 are retracted, the support frame 61 will be lowered toward the ground.

As illustrated in FIGS. 1 and 2, side segments 63 and 64 of the support frame 61 of rear towed mower 22 are supported by caster wheels 126 and 127, with the caster wheels each having a support arm 128 extending from the stem 129 of each caster wheel laterally over to the decking of the side segment 63 or 64 of the rear towed mower 22. With this arrangement, the outer side portions of the side segments 63 and 64 of the support frame 61 are supported by the caster wheels 126 and 127, so that the side segments can undulate or pivot with respect to the central segment 62 in bat-wing fashion.

Each side segment 63 and 64 includes a hydraulic motor 130 that drives a sheave 131, with the sheave powering the driving belt 132. The driving belt 132 extends about the cutter blade sheaves 134 and 135, with one or more spring urged idler sheaves 136 and 137 applying tension to the driving belt 132. The cutter sheaves 134 and 135 each are mounted to a mandrel that is connected to a cutting blade 138a and 138b, respectively, beneath the decking of the side segments 63 and 64, so that the driving belt 132 rotates the cutting blades at high angular velocities so as to cause the cutting blades to cut the grass or other vegetation immediately beneath the side segments 63 and 64.

The embodiment of the towed cutter illustrated in FIGS. 1-3 includes two rotary cutting blades 138a and 138b positioned in each side segment 63 and 64 of the support frame 61 of the rear towed mower 22, with the cutting blades sloped rearwardly on opposite sides of the mower assembly so that they slightly overlap with respect to each other as the mower assembly moves in a forward direction as indicated by direction arrow 140. The overlapping cutting blades therefore cut a continuous swath in the grass as indicated by dash lines 141 and 142, and 143, 144; respectively. The swath lines 142 and 143 are positioned so as to overlap the swath cut by the front mower 21, as indicated by swath lines 54 and 55.

As illustrated in FIG. 1, the forward edge portions or skirts 146 of the decking of the cutter unit 30 of the front mower 21 curve about the paths of the outer end portions of the cutting blades 53a and 53b. The front skirts 148 of the side segments 63 and 64 of the rear towed mower 22 are sloped rearwardly and outwardly. This slanted arrangement provides a fender effect for the towed mower, in that if the fender 148 of either side segment 63 or 64 should engage an obstruction the fender tends to either push the obstruction out of the path of the towed mower, or if the obstruction is immovable, the fender engages the obstruction and urges the towed mower laterally and guides the towed mower around the obstruction. The towed mower tends to skew laterally about its trailer tongue vertical axis 114 when encountering the immovable object, and the relatively light weight of the towed mower, together with the caster wheels 126 and 127, tend to permit this skewing movement. The wheels 75 and 76 tend to skid laterally during this movement.

Bumpers 149 are mounted to the decking to provide additional protection for the front skirts 148 when the side segments are raised to upright positions. Likewise, bumpers 77 extend from the support arms 79 in front of wheels 76 to protect the wheels from obstructions. In the preferred embodiment, the outside width of the towed mower with the vertically hinged side frame segments pivoted up to vertical nonoperating positions is less than the outside width of the front mower so that the towed mower will avoid collision with objects trimmed around with the front mower.

Figure 4:
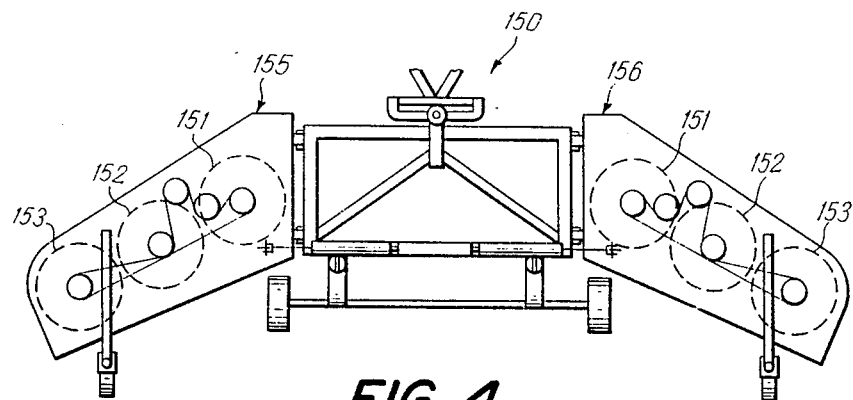
FIG. 4 is a plan view of a second embodiment of the towed mower, with the mower having three cutters in each side segment.

FIG. 4 illustrates another embodiment of the towed mower 150, in which three rotary cutting blades, 151, 152 and 153 are mounted in each side segment 155, 156. The blades 151-153 in each side segment are angled rearwardly in bat-wing fashion so that the blades slightly overlap one another in the forward direction of movement to avoid streaks of uncut grass being left in the swath of cut grass.

Figure 5:
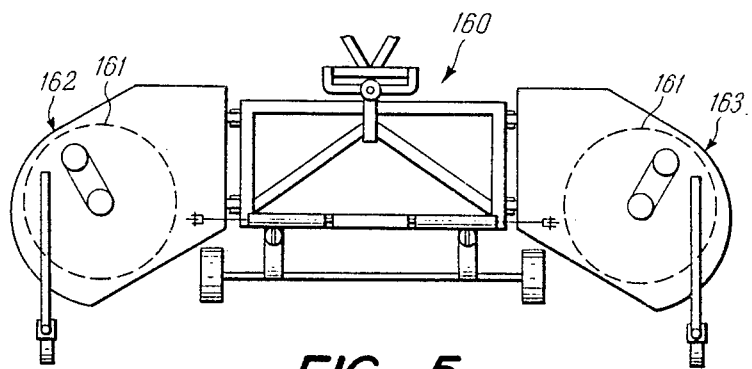
FIG. 5 is a plan view of another embodiment of the towed mower, with the mower having a single cutter in each side segment.

FIG. 5 illustrates another embodiment 160 of the towed mower, whereby a single cutting blade 161 is mounted in each side segment 162, 163 of the towed mower.

Figure 6:
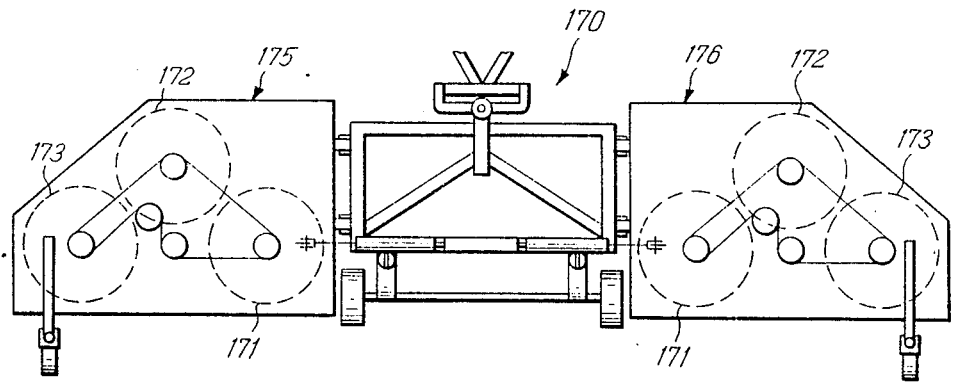
FIG. 6 is a plan view of another embodiment of the towed mower with the mower having three cutters arranged in a staggered relationship in each side segment.

FIG. 6 illustrates yet another embodiment of the towed mower whereby the towed mower 170 has three cutting blades 171, 172 and 173 arranged in triangular relationship in each side segment 175, 176.

Figure 7:
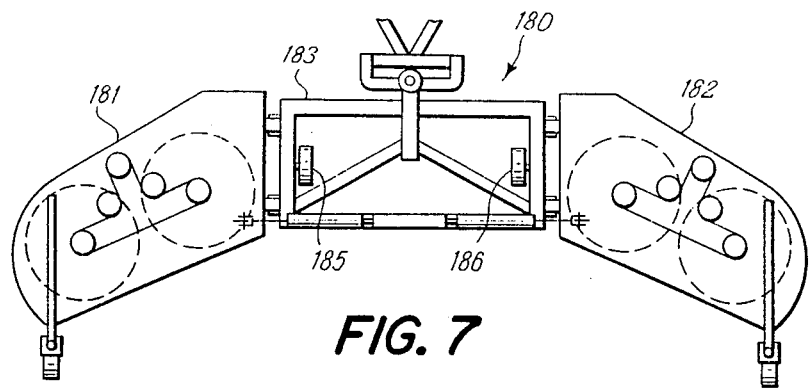
FIG. 7 is a plan view of another embodiment of the towed mower with the support wheels of the central segment being located beneath the central segment.

FIG. 7 discloses another embodiment of the towed mower 180 which includes side segments 181 and 182 constructed in a manner similar to that illustrated in FIGS. 1-3, but a central segment 183 that has its central support wheels 185 and 186 located beneath the central segment of the support frame. The location of the wheels 185 and 186 in this manner tends to cause more of the weight of the towed mower to be supported on its wheels rather than on its trailer hitch.

While the prior art towed mowers require the operator to look back to view the operation of the towed mowers when trimming about obstacles, this invention utilizes the front mower for trimming. One or both of the two side segments 63 and 64 are raised to their vertical nonfunctioning positions where they are located inside the swath cut by the front cutter and are out of the way of the obstacle being trimmed around. This allows the operator to cut with the front mower adjacent an obstacle without having to worry about a rear mower impacting the obstacle and permits the operator to observe the trimming operation while still looking in the direction of movement of the mower.

Figure 8:
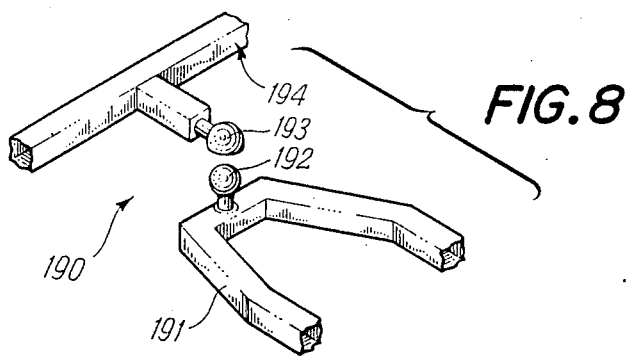
FIGS. 8, 9, 10 and 11 are perspective illustrations of trailer hitch constructions which can be utilized to connect the towed mower to the front self propelled mower.

As illustrated in FIG. 8, the trailer hitch 190 can be substituted for the trailer hitch of FIG. 3 if the forward hitch member 191 is rigidly, not pivotally, attached to the front mower. The ball 192 is mounted to the forward hitch member 191, and the socket 193 is mounted to the support frame 194 of the towed mower. The socket 193 simply receives and rests on the ball 192 in the conventional trailer hitch manner.

Figure 9:
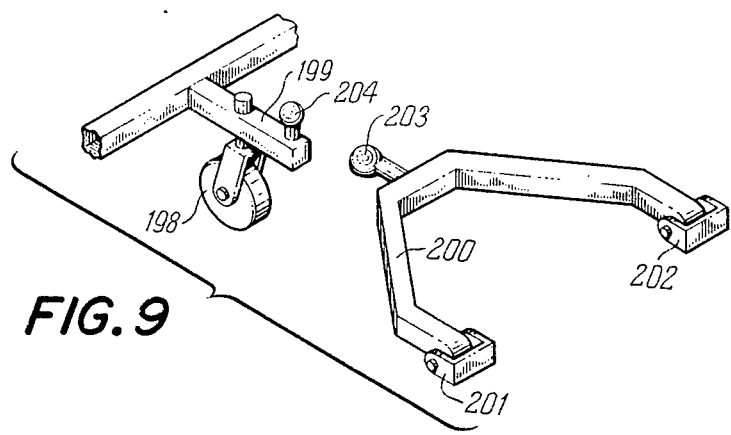

As illustrated in FIG. 9, another trailer hitch connection can be formed between the front mower and the towed mower, by mounting a caster wheel 198 to the forward portion of the support frame 199 of the towed mower so that the front portion of the towed mower is supported by the caster wheel 198 and the towed mower remains in a fixed attitude and is self-supporting. The U-shaped forward hitch member 200 has the distal ends of its arms pivotally connected in clevises 201 and 202, and a socket 203 is mounted to the forward hitch member 200 so as to receive and rest upon the ball 204 of the towed cutter.

Figure 10:
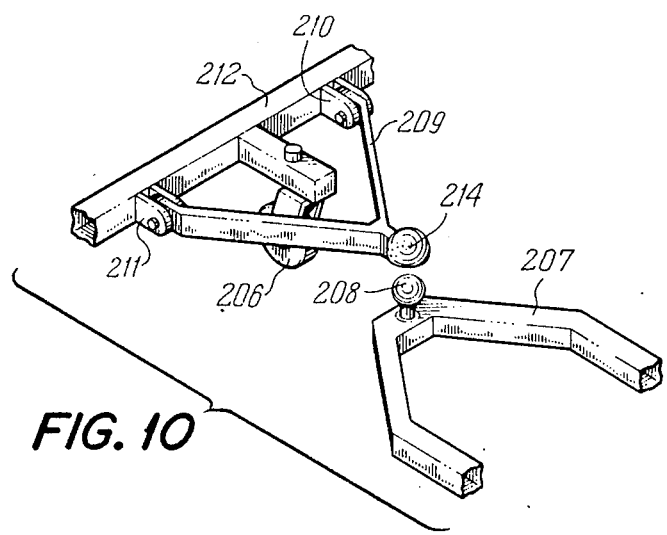

FIG. 10 illustrates another trailer hitch construction which includes a caster wheel 206 that supports the forward portion of the towed mower, a rigid forward hitch member 207 is mounted to the rear of the front mower and supports the ball 208, and the rear hitch member 209 is pivotally connected in clevises 210 and 211 to the central segment 212 of the towed mower. The socket 214 is mounted to rear hitch member 209 and receives ball 208.

Figure 11:
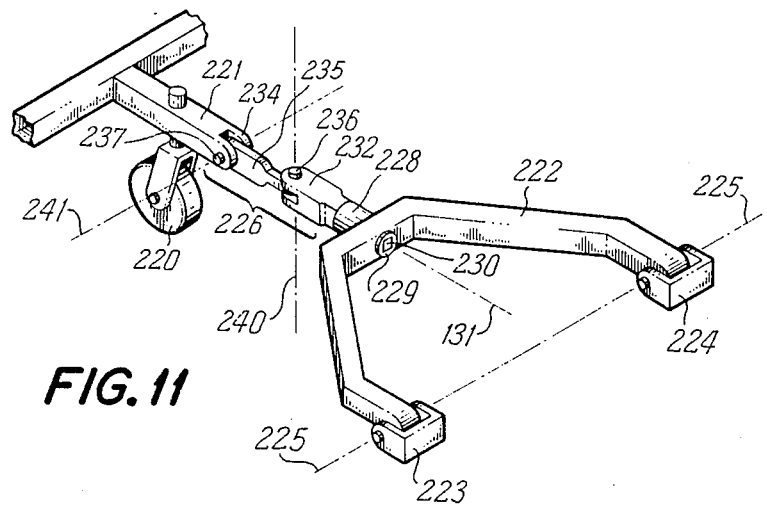

FIG. 11 illustrates another trailer hitch construction which includes a caster wheel 220 mounted to tongue 221 that supports the forward portion of the towed mower, a U-shaped forward hitch member 222 pivotally connected in clevises 223 and 224 about horizontal axis 225 to the front mower (not shown) and universal joint 226 extending between the front mower and the towed mower. The universal joint includes first connector 228 which extends through U-shaped hitch member 222 and is connected thereto by a washer 229 and bolt 230 so that the first connector is pivotable about longitudinal axis 131. The rear end portion of first connector 228 comprises a clevis 232. The forward end portion of tongue 221 also comprises a clevis 234, and intermediate link 235 is connected at its ends to the clevises. The clevises and their pivot pins 236 and 237 are oriented at 90° angles with respect to each other and link 235 is pivotable about vertical axis 240 and horizontal axis 241.

Figure 12:
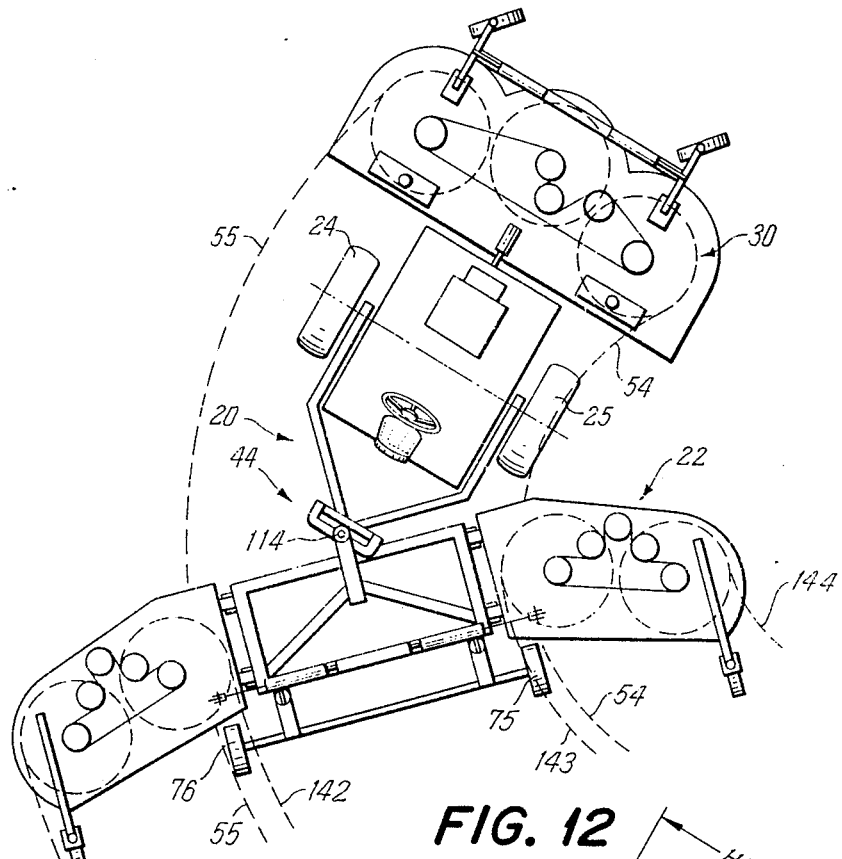
FIG. 12 is a plan view of the mower assembly of FIG. 1, and illustrating how the mower assembly performs when operating in a turn.
Figure 13:
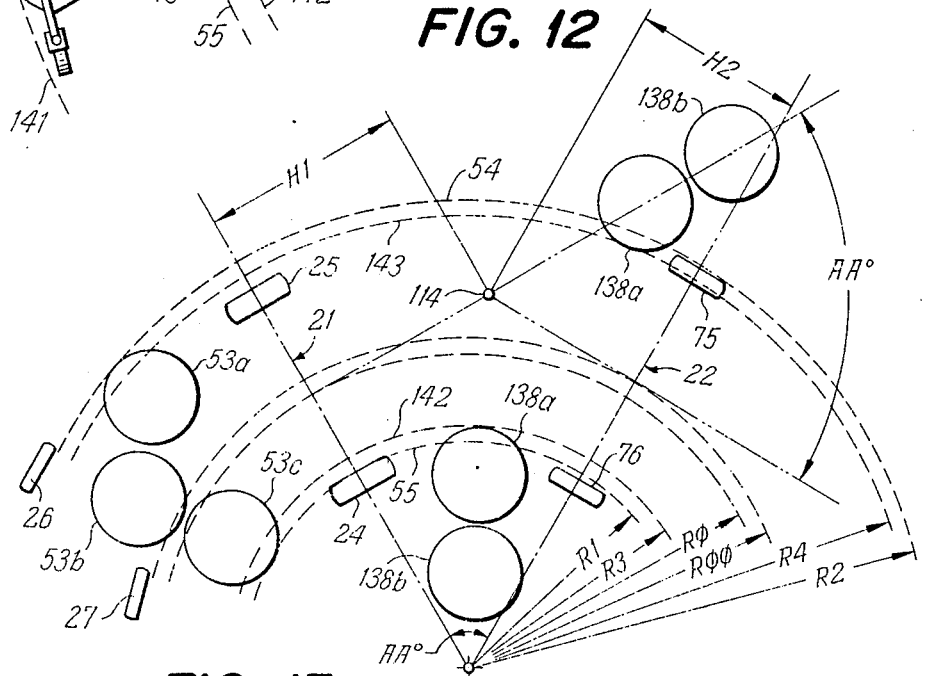
FIG. 13 is a schematic illustration of the mower assembly when in a turn, demonstrating how the proportions of the mower are calculated so as to provide a swath cut in the grass by both the front self propelled mower and the rear towed mower without having streaks of uncut grass appear in swaths of cut grass.

FIG. 12 is a schematic plan view of the mower and shows how the mower assembly 20 performs when moving through a right hand turn. The rotary cutters of the cutter unit 30 of the front mower 21 cut a swath as indicated by the right and left swath cuts 54 and 55. In the meantime, the towed cutter 22 cuts swaths that straddle and slightly overlap the swath 54, 55, as indicated by the swath cut lines 141, 142 and 143, 144. The distance ($H_1$) of the vertical axis 114 of the trailer tongue 44 to the rear driving wheels 24 and 25 of the front mower as compared to the distance ($H_2$) from the vertical axis 114 of the trailer tongue to the central support wheels 75, 76 is constructed so that the towed mower always cuts its swath in straddling, overlapped relationship with the swath cut by the front mower even when the mower assembly moves through a sharp turn in which the front mower is angled up to 60° with respect to the towed mower. These distances are indicated on FIG. 13 by the designations $H_1$ and $H_2$.

The following formulas show the dimensional relationship between the front mower and towed mower necessary to eliminate streaking in which:

$H_1$ = distance between vertical axis 114 and the axis of rotation of rear driving wheels of front mower 21

$H_2$ = distance between vertical axis 114 and the axis of rotation of central support wheels of rear towed cutter 22

WB = Wheelbase = $H_1 + H_2$

AA = Articulation Angle $$H_2 = WB - H_1$$

$$H_1 = H_1 \cos AA + WB - \left( \frac{R\phi}{\tan(90° - AA)} \right) \cos AA$$

$$H_1 = H_1 \cos AA + WB - [R\phi\phi + H_2 \tan AA][\cos AA \times \cos(90° - AA)]$$

Where $R\phi$ and $R\phi\phi$ are such that $R_3 - R_1 = R_2 - R_4$ where $R_1$ is the radius from the turning center of the mower to the inside edge 55 of the swath of the cutter unit 30, $R_2$ is the radius from the center to the outside edge 54 of that swath, $R_3$ is the radius from the center to the swath cut line 142, $R_4$ is the radius from the center to the swath cut line 143, $$R\phi = \frac{(H_1 \cos AA + H_2)}{(\cos AA)} \tan(90° - AA)$$

$$R\phi\phi = \frac{H_1 \cos AA + H_2}{\cos AA \cdot \cos(90° - AA)} - H_2 \tan AA$$

-continued $$H_2 = WB - H_1$$

$$R\phi = \frac{(H_1 \cos AA + WB - H_1)}{(\cos AA)} \tan(90° - AA)$$

$$\frac{R\phi}{\tan(90° - AA)} = \frac{H_1 \cos AA + WB - H_1}{\cos AA}$$

$$\frac{[R\phi]}{[\tan(90° - AA)]} \cdot \cos AA = H_1 \cos AA + WB - H_1$$

$$H_1 = H_1 \cos AA + WB - \frac{[R\phi]}{[\tan(90° - AA)]} \cos AA$$

$$R\phi\phi = \frac{H_1 \cos AA + H_2}{\cos AA \cdot \cos(90° - AA)} - H_2 \tan AA$$

$$H_2 = WB - H_1 \text{ where } WB = \text{wheelbase}$$

$$R\phi\phi = \frac{H_1 \cos AA + WB - H_1}{\cos AA \cdot \cos(90° - AA)} - H_2 \tan AA$$

$$R\phi\phi + H_2 \tan AA = \frac{H_1 \cos AA + WB - H_1}{\cos AA \cdot \cos(90° - AA)}$$

$$[R\phi\phi + H_2 \tan AA][\cos AA \cdot \cos(90° - AA)] =$$

$$H_1 \cos AA + WB - H_1$$

$$H_1 + [R\phi\phi + H_2 \tan AA][\cos AA \cdot \cos(90° - AA)] =$$

$$H_1 \cos AA + WB$$

$$H_1 = H_1 \cos AA + WB -$$

$$[R\phi\phi + H_2 \tan AA][\cos AA \cdot \cos(90° - AA)]$$

The formula describes in mathematic terms the relationship of the dimensions of the front and rear mower that must be maintained to accomplish tracking where the rear swaths will coincide with the front swath. The actual relationship between these components can be deviated from so long as the designed overlap in cutting swaths are adequate to compensate for these deviations. The cutting swaths of the rear cutters must always overlap the cutting swath of the front cutter so as to compensate for errors in the rear mower tracking behind the front mower. For example, when the mower assembly is operating on a sloped surface the towed mower tends to skid sideways down the sloped surface. Also when the mower assembly is driven at a fast pace through a turn the rear mower is urged by centrifugal force outwardly of the turn. Also there may be intentional and unintentional manufacturing deviations from the formula which cause the towed mower to incorrectly track behind the front mower.

The invention has been disclosed with the internal combustion engine 31 and pumps 32, 33 and 34 serving as power means for operating the hydraulic motor 45, power steering cylinders, hydraulic cylinders 70, 71, 83, 84 and 124. Additional pumps can be mounted to the cluster of pumps 32-34, if desired so as to provide more sources of power, as may be desired. The hydraulic conduits which extend from the pumps to the motors and cylinders have not been shown to simplify the drawings. However, it will be understood by those skilled in the art that other power units can be utilized, if desired. For example, a separate internal combustion engine can be mounted to the towed mower unit and can provide the power for the cutters of the side segments. Further, when the towed mower is used behind the type of power unit that includes a mechanical power take-off system, a conventional gearbox and shafts extending from the gearbox out to the cutting blades of each side frame segment can be used.

Further, the front mower can comprise the type of mower that includes a support frame with one or more cutters suspended from the frame.

The cutters illustrated and described herein comprise rotary cutting blades; however, other type cutters can be used, if desired, such as reel, sickle and flail cutters.

It should be understood that the embodiments of the invention disclosed herein illustrate principles of the invention in a preferred form. Other modifications, additions and deletions may be made thereto without departure from the spirit and scope of the invention as set forth in the following claims.

I claim:

1. In combination a self propelled front mower and a towed rear mower for cutting grass and other vegetation, said front mower comprising rear driving wheels engaging the ground surface for moving the front mower in a forward direction and front cutter means arranged for cutting a swath in the grass and like vegetation beneath the front mower, said rear mower including a support frame extending laterally on opposite sides of the swath to be cut by said front mower, wheel means supporting said support frame on the ground surface, rear cutters mounted to said support frame and spaced from each other on opposite sides of the swath cut by said front mower a distance to cut swaths in the grass and the like beneath the rear mower that partially overlap the swath cut by said front mower, connecting means for connecting said rear mower to said front mower in trailer fashion for allowing said rear mower to pivot with respect to said front mower about a substantially upright axis, the dimensions between the upright axis of said connecting means and the rear driving wheels of said front mower, and between the upright axis of said connecting means and the wheels means of the support frame of said rear mower, and the placement of the front cutter means and of the rear cutters of the support frame of said rear mower are selected to cause the rear cutters to straddle and overlap the swath cut by the front cutter means as the front mower and towed rear mower move through a turn, and power means for driving said driving wheels, said front cutter means and said rear cutters.

2. The combination of claim 1 and wherein said power means comprises an internal combustion engine mounted to said front mower in a position in front of said driving wheels, and wherein said front cutter means comprises at least one rotary cutter positioned in front of said internal combustion engine.

3. The combination of claim 2 and wherein said front mower comprises a power unit with said internal combustion engine and said driving wheels mounted on said power unit and a cutter deck positioned in front of said power unit and said rotary cutter mounted on said cutter deck, and pivot connecting means connecting together said power unit and said cutter deck about an axis extending longitudinally with respect to the forward direction of movement of said front mower.

4. The combination of claim 1 and wherein the support frame of said rear mower comprises three laterally extending segments including a central segment and side segments positioned on opposite sides of said central segment, said side segments each movably connected to said central segment and with each segment including wheels or the like for supporting the rear portions of the segments from the ground surface, said connecting means being mounted to said central segment, and said rear cutters being carried by said side segments.

5. The combination of claim 1 and wherein said connecting means pivotally connects said rear mower to said front mower adjacent said rear driving wheels and applies a portion of the weight of the rear mower to the front mower at the rear driving wheels of the front mower.

6. The combination of claim 4 and wherein said connecting means pivotally connects the forward portion of the central segment of said rear mower to said front mower adjacent the rear driving wheels of said front mower and applies a portion of the weight of said rear mower to the front mower at the rear driving wheels of the front mower.

7. The combination of claim 4 and wherein the central segment of said rear mower includes a wheel or the like for supporting the forward portions of the segments from the ground surface.

8. In combination, a self propelled front mower and a towed rear mower for cutting grass and other vegetation, said front mower comprising rear driving wheels engaging the ground surface for mowing the front mower in a forward direction and front cutter means arranged for cutting a swath in the grass and like vegetation beneath the front mower, said rear mower including a support frame extending laterally on opposite sides of the swath to be cut by said front mower, wheel means supporting said support frame on the ground surface, rear cutters mounted to said support frame and spaced from each other on opposite sides of the swath cut by said front mower a distance to cut swaths in the grass and the like beneath the rear mower that partially overlap the swath cut by said front mower, connecting means connecting said rear mower to said front mower in trailer fashion, said support frame of said rear mower comprising three laterally extending segments including a central segment and side segments positioned on opposite sides of said central segment, said side segments each movably connected to said central segment and with each segment including wheels or the like for supporting the rear portions of the segments from the ground surface, said connecting means being mounted to said central segment, and said rear cutters being carried by said side segments, said connecting means comprising an approximately U-shaped forward hitch member connected at the free ends of its arms to the front mower at said rear driving wheels, and a universal joint connected between said forward hitch member and the central segment of said rear mower, and power means for driving said driving wheels, said front cutter means and said rear cutters.

9. The combination of claim 8 and wherein said forward hitch member is pivotally connected to the front mower at said rear driving wheels, and further including means for adjusting the height of the universal joint from the ground surface.

10. The combination of claim 8 and further including means for adjusting the height of said central segment from the ground surface.

11. In combination, a self propelled front mower and a rear towed mower, said front mower comprising a power unit with driving wheels engaging the ground surface and for moving the front mower in a forward direction and a front cutter with wheels engaging the ground surface, said front cutter positioned in front of said power unit and including blades for cutting a swath of grass or the like as the mower moves in a forward direction, a tilt connector mounted to said power unit and to said front cutter and arranged to permit the front cutter to tilt with respect to said power unit about an axis extending in the forward direction of movement of the power unit, said towed mower comprising first and second side cutters with cutting blades positioned in overlapping straddling relationship with respect to the swath cut by the cutting blades of said front cutter when the mower and towed mower move in a forward direction, wheel means mounted to said towed mower for movably supporting the towed mower on the ground surface, a hitch assembly extending forwardly from said towed mower and connected to said power unit, said hitch assembly including a universal joint that permits pivoting of said towed mower about upright, lateral and longitudinal axes with respect to said front mower.

12. The combination of claim 11 and wherein the dimensions between the upright axis and the driving wheels of said front mower and between the upright axis and the wheel means of the towed mower and the placement of the cutting blades of said front cutter and the cutting blades of said side cutters are selected to cause the rear cutters to straddle and overlap the swath cut by the front cutter as the front and rear mower move through a turn.

13. The combination of claim 12 and wherein the structure of the front and rear mowers and formed in accordance with:

$H_1$ = distance between vertical axis 114 and the axis of rotation of rear driving wheels of front mower 21

$H_2$ = distance between vertical axis 114 and the axis of rotation of central support wheels of rear towed cutter 22

WB = Wheelbase = $H_1 + H_2$

AA = Articulation Angle $$H_2 = WB - H_1$$

$$H_1 = H_1 \cos AA + WB - \left(\frac{R\phi}{\tan(90° - AA)}\right) \cos AA$$

$H_1 = H_1 \cos AA + WB - [R\phi\phi + H_2 \tan AA]$
$[\cos AA \cdot \cos(90° - AA)]$ where $R\phi$ and $R\phi\phi$ are such that $R_3 - R_1 = R_2 - R_4$
where $R_1$ is the radius from the turning center of the mower to the inside edge 55 of the swath of the cutter unit 30, $R_2$ is the radius from said center to the outside edge 54 of that swath, $R_3$ is the radius from said center to the swath cut line 142, $R_4$ is the radius from said center to the swath cut line 143.

$$R\phi = \frac{(H_1 \cos AA + H_2)}{(\cos AA)} \tan(90° - AA)$$

and $$R\phi\phi = \frac{H_1 \cos AA + H_2}{\cos AA \cdot \cos(90° - AA)} - H_2 \tan AA$$

$$H_2 = WB - H_1$$

-continued $$R\phi = \frac{(H_1 \cos AA + WB - H_1)}{(\cos AA)} \tan(90° - AA)$$

$$\frac{R\phi}{\tan(90° - AA)} = \frac{H_1 \cos AA + WB - H_1}{\cos AA}$$

$$\frac{[R\phi]}{[\tan(90° - AA)]} \cdot \cos AA = H_1 \cos AA + WB - H_1$$

$$H_1 = H_1 \cos AA + WB - \frac{[R\phi]}{[\tan(90° - AA)]} \cos AA$$

$$R\phi\phi = \frac{H_1 \cos AA + H_2}{\cos AA \cdot (90° - AA)} - H_2 \tan AA$$

$$H_2 - WB - H_1 \text{ where } WB = \text{wheelbase}$$

$$R\phi\phi = \frac{H_1 \cos AA + WB - H_1}{(\cos AA \cdot \cos(90° AA))} - H_2 \tan AA$$

$$R\phi\phi + H_2 \tan AA = \frac{H_1 \cos AA + WB - H_1}{\cos AA \cdot \cos(90° - AA)}$$

$$[R\phi\phi + H_2 \tan AA][\cos AA \cdot \cos(90° - AA)] =$$

$$H_1 \cos AA + WB - H_1$$

$$H_1 + [R\phi\phi + H_2 \tan AA][\cos AA \cdot \cos(90° - AA)] =$$

$$H_1 \cos AA + WB$$

$$H_1 = H_1 \cos AA + WB - [R\phi\phi + H_2 \tan AA]$$

$$[\cos AA \cdot (90° - AA)]$$

14. In combination, a self propelled front mower and a rear towed mower for cutting grass and other vegetation, said front mower comprising a power unit with driving wheels engaging the ground surface and for moving the front mower in a forward direction and a front cutter with wheels engaging the ground surface, said front cutter including blades for cutting a swath of grass or the like as the mower moves in a forward direction, said towed mower comprising first and second side cutters with cutting blades positioned in overlapping straddling relationship with respect to the swath cut by the cutting blades of said front cutter when the mower and towed mower move in a forward direction, wheel means mounted to said towed mower for movably supporting towed mower on the ground surface, a hitch assembly extending forwardly from said towed cutter and connected to said power unit, said hitch assembly including a universal joint that permits pivoting of said towed mower about upright, lateral and longitudinal axes with respect to said front mower, the driving dimensions between the upright axis and the driving wheels of said front mower and between the upright axis and the wheel means of the towed mower and the placement of the cutting blades of said front cutter and the cutting blades of said side cutters are selected to cause the rear cutters to straddle and overlap the swath cut by the front cutter as the front and rear mower move through a turn.

15. In combination, a self propelled front mower and a detachable rear towed mower, said front mower comprising a power unit with driving wheels engaging the ground surface and for moving the front mower in a forward direction, and a front cutter positioned in front of the driving wheels of said power unit for cutting a swath of grass or the like as the front mower moves in a forward direction, said towed mower comprising a frame formed in three segments extending laterally with respect to each other and with respect to the direction of forward movement of said mower including a central frame segment and side frame segments positioned on opposite sides of said central frame segment, said central frame segment being aligned with said front cutter along the direction of forward movement of said front mower so as to follow in the swath cut by said front cutter, a connector means including a universal joint connecting the central frame segment of said towed mower to said front mower, and wheels mounted to said central frame segment for supporting said central frame segment from the ground surface, pivot connectors mounted between each of said side frame segments and said central frame segment for partially supporting said side frame segments from said central frame segment and to permit said side frame segments to pivot up and down with respect to said central frame segment, at least one wheel means mounted to each of said side frame segments for supporting each side frame segment from the ground surface, cutters mounted to each side frame segment for cutting swaths in the grass and the like that straddle the swath cut by said front cutter, and means mounted to said frame for transmitting power to the cutters of said side frame segments.

16. The combination of claim 15 and wherein at least one wheel means mounted to each of said side frame segments comprises a caster wheel normally in engagement with the ground surface behind each said side frame segment, and wherein the wheels mounted to said central frame segment comprise at least two wheels mounted beneath said central frame segment.

17. The combination of claim 15 and wherein said at least one wheel means mounted to each of said side frame segments comprise a caster wheel normally in engagement with the ground surface behind said frame.

18. The combination of claim 15 and wherein said wheels mounted to said central frame segment comprise at least two wheels mounted beneath said central frame segment between said side frame segments.

19. The combination of claim 15 and wherein said wheels mounted to said central frame segment comprise at least two wheels with each wheel mounted laterally out to one side and to the rear of said central frame segment.

20. The combination of claim 15 and wherein said wheels mounted to said central frame segment are positioned between said side frame segments.

21. The combination of claim 15 and wherein central frame segment further includes at its forward end portion a ground engaging support means so that said towed mower is self supporting in a proper cutting attitude, and wherein said connector means is pivotably mounted to said central frame segment about a laterally extending axis.

22. The combination of claim 21 and wherein said ground engaging support means comprises a caster wheel.

23. The combination of claim 21 and wherein said connector means is pivotably mounted to said power unit about a laterally extending axis.

24. The combination of claim 15 and further including pivot connecting means connecting together said power unit and said front cutter unit about an axis extending longitudinally with respect to said power unit and said front cutter unit.

* * * * *